INVENTOR.
MICHAEL F. FIELD

May 7, 1968   M. F. FIELD   3,381,543

ROLLING MILL SCREWDOWN

Filed Feb. 7, 1967   2 Sheets-Sheet 2

*INVENTOR.*
MICHAEL F. FIELD

BY

*Henry O. Westin*

HIS ATTORNEY

# United States Patent Office 3,381,543
Patented May 7, 1968

3,381,543
ROLLING MILL SCREWDOWN
Michael Frank Field, Dollard-des-Ormeaux, Canada, assignor to Dominion Engineering Works Limited, Montreal, Quebec, Canada, a corporation of Canada
Filed Feb. 7, 1967, Ser. No. 614,514
Claims priority, application Canada, Apr. 21, 1966, 958,460
5 Claims. (Cl. 74—409)

ABSTRACT OF THE DISCLOSURE

This invention is directed to an anti-backlash screwdown arrangement, and in particular to a rolling mill screwdown arrangement.

---

In rolling mills such as steel rolling mills, the forces exerted upon the rolls thereof are quite excessive, and require support and operating structures of great mass and strength. Owing to improved techniques in gauging, the capability of exercising monitoring control over the thickness of the product produced by the rolls has exceeded the capability of the rolling machinery to respond accurately and rapidly to the need for roll position changes signalled by the thickness monitoring means. In roll screwdown arrangements presently in use, owing to the backlash which exists in the roll positioning mechanism it is difficult to the point of being virtually impossible to accurately and rapidly position the rolls in selected opening or closing direction. With prior screwdown arrangements, when the material gauging monitors indicate that the roll gap requires to be increased, the electric motor and its associated worm gear commences rotation in a roll gap opening sense, but due to the excessive backlash present in the mechanisms, a considerable motor motion occurs before any roll-opening movement takes place at the pressure roll. When the stage is reached that the pressure roll is being raised, the momentum of the driving motor and associated gears has reached the proportions such that the screwdown mechanism overshoots the required correction, thus causing the gauging device to call for a further and opposite correction which leads to a form of hunting of the screwdown device.

In prior devices employing an electric motor to effect the screwdown, it has been usual for a worm driven by the motor to drive a worm gear splined to the screwdown shaft, considering one side of the roll screwdown arrangement. A stationary nut threadably mounted on the screw of the screwdown and immovably secured to the frame of the mill produces axial displacement of the screw when it rotates in driven relation with the actuating motor. This rotational and axial displacement of the screw is transmitted by way of a rotary thrust pad to a bearing housing mounted for vertical sliding motion and carrying a pressure roll. Unwanted backlash occurs at a number of positions in prior screwdown mechanisms, particularly between the worm and the worm gear, and between the worm gear and the splined shaft. Backlash between the threads of the screw and the threads of the stationary nut, between the stationary nut and the housing containing the nut, and between the rotating end of the screw and the thrust bearing secured to the bearing housing of the pressure roll is usually avoided by use of roll balance lifting devices in counterbalancing lifting relation with the pressure roll and the top roll of the nip rolls.

The present invention reduces backlash in a mill screwdown arrangement by mounting the screw for substantially axial sliding movement only and providing pretensioned restraining torque arm means to substantially eliminate unwanted rotational movement of the shaft, the axial displacing force being applied to the shaft by way of a nut threadably mounted thereon and secured for rotation within the housing of the mill, drive thereto being supplied by rigidly connected gear means. Adoption of this arrangement makes it possible to employ pretensioned bearing and guide means for the stabilizing torque arm, so that in operation the response to a gauge change signal is more rapid because the drive motor has less lost motion, while at the same time the kinetic energy of the motor is not allowed to build up, thereby reducing the tendency to overshoot.

The present invention provides in a rolling mill screwdown mechanism having a roll rotatably mounted in end bearings movable longitudinally within end frames, roll positioning means for longitudinally positioning the bearings within the frames, each positioning means including a threaded shaft in positioning relation with the housing of the bearing slidably mounted in the respective frame and extending in the desired positioning direction, nut means rotatably mounted in the frame in threaded engagement with the shaft, and having an axial end face thereof in supported axial thrust relation with a portion of the frame, and power input means in rotary driving connection with the nut means, the improvement comprising: substantially rigid torque arm means secured to the shaft, and torque arm guide means in fixed relation with the frame contacting the torque arm means in substantially backlash precluding relation to limit rotational movement thereof, whereby axial movement of the shaft on rotation of the nut means is accurately controlled to provide substantial elimination of backlash.

It will be understood that the present invention is not directed to the elimination of backlash normally experienced in the drive gear teeth.

An embodiment of the present invention is described by way of example, reference being had to the accompanying drawings, wherein.

Figure 1:
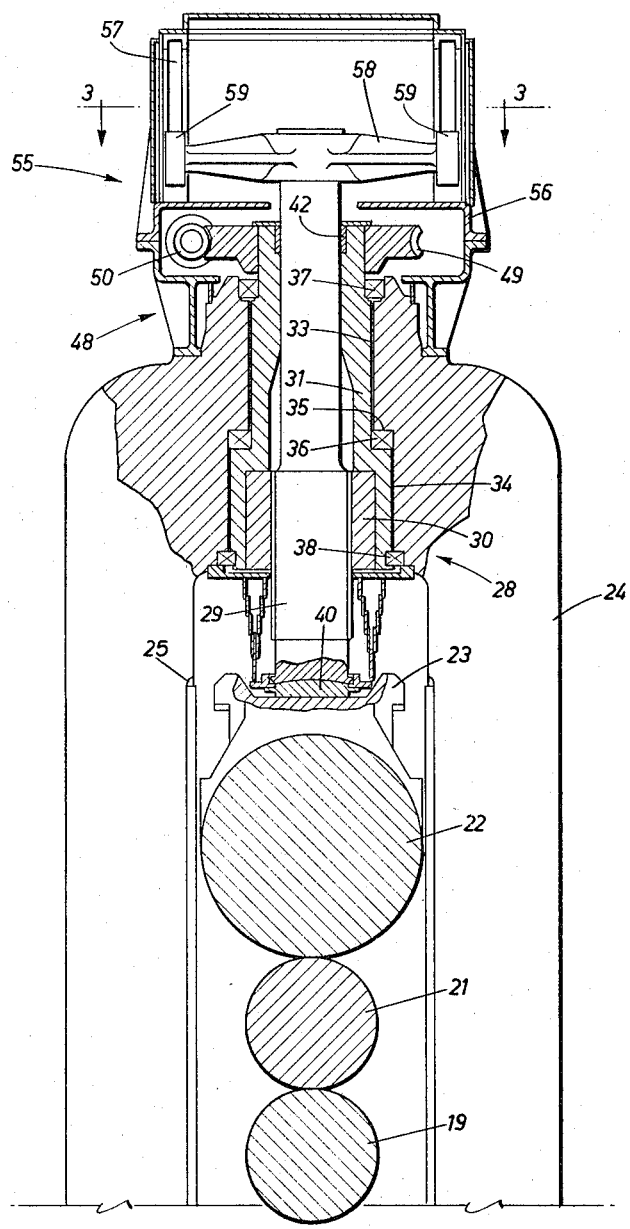
FIGURE 1 is a side elevation in part section of a screwdown arrangement according to the present invention.

Referring to FIGURE 1, the roll stand includes a pair of nip rolls 19 and 21, having a pressure roll 22 mounted thereover, being rotatably mounted in a bearing housing 23 slidably mounted in a portion 24 of the mill housing in a slide way 25. The vertical position of the bearing housing 23 is controlled by the mill screwdown assembly 28 comprising a screw 29 axially positioned by means of a rotatable nut 30 driven by an arbor 31.

The arbor 31 is secured to a worm wheel 49 for rotation therewith, when driven by a worm 50 directly coupled to an electric driving motor 51.

The screw 29 is restrained against unwanted rotation by the torque arm means 55 located at the top of the mill in a housing upper extension 56.

Figure 2:
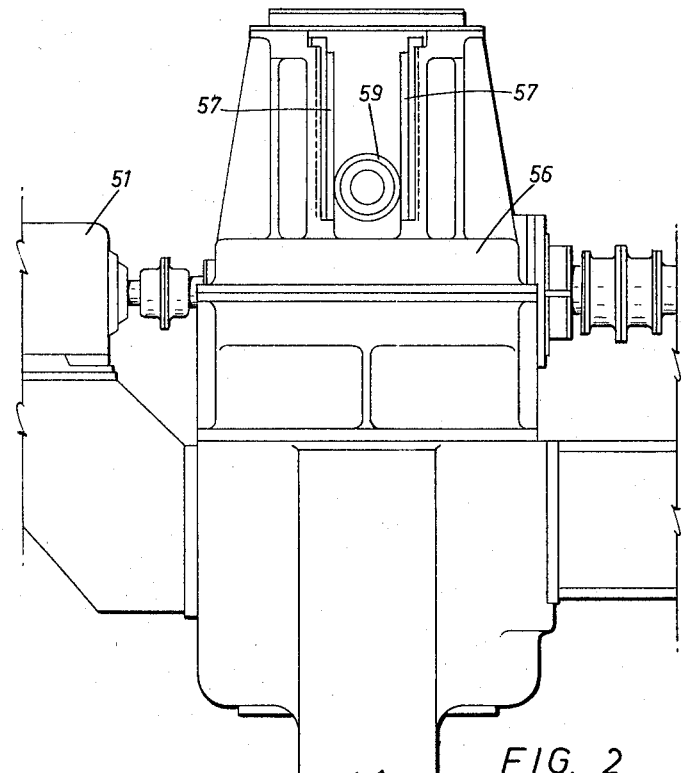
FIGURE 2 is an end view of FIGURE 1.
Figure 3:
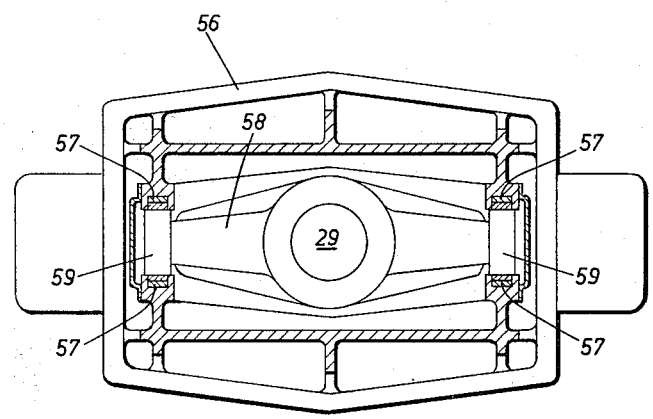
FIGURE 3 is a section view taken on the line 3—3 of FIGURE 1.

Referring in further detail to FIGURES 1, 2, and 3, the nut member 30 is secured rigidly within the arbor 31 which is mounted in an arbor recess 33 forming a part of the axial housing bore through which the screw 29 extends, the arbor recess 33 having a portion of greater diameter to form a thrust housing 34 with an annular thrust face 35 at the top end thereof. The arbor main thrust bearing 36 which provides the full load reaction force on the screw 29 is preferably of the taper roller thrust type to withstand the high axial loading. The lower end of the arbor 31 is supported by a bottom bearing 38, being generally of the radial thrust type adjustably mounted in the housing 34 so that longitudinal and radial clearances in bearings 36 and 38 can be reduced substantially to zero. The upper arbor bearing 37 is relatively lightly loaded and serves mainly to center the arbor within the arbor recess 33.

The axial downward thrust provided by the screw 29 is transmitted to the bearing housing 23 by way of a spherical thrust pad 40, while the upper end of the screw is slidably mounted within the arbor 31 by means of a bushing 42 located within the arbor 31.

A hydraulic roll balance lifting device or an equivalent counterbalancing device (not shown) operating on the top roll 21 of the nip pair, upon the pressure roll 22 and upon the bearing housing 23 of the pressure roll 22 serves to raise the rolls 21 and 22 upwardly whenever the screw 29 is withdrawn in load diminishing movement, as is well known to one skilled in the art.

Rotation of the arbor 31 is provided by arbor drive means 48, illustrated in the present embodiment as a worm wheel 49 substantially immovably attached to the arbor 31, being in driven engagement with a worm 50 driven by an electric motor 51.

The screw 29 is restrained against unwanted rotational movement by torque arm means 55 mounted in the housing upper extension 56 and having stationary guides 57 providing rotational restraint forces to the yoke 58 through rollers 59. The rollers 59 are preferably of the preloaded taper roller bearing type and may be so tensioned that no free movement exists under the full torsional loads exerted by the yoke 58. The opposing guides 57 by which the rollers 59 are restrained are preferably adjustably spaced by means such as tapered backing strips 65, so that clearance between the guides 57 and the rollers 59 can be reduced substantially to zero.

It will be understood that under typical mill loadings such as an 11,000,000 pound nip force divided between two such screws, the torsional loads which the torque arm means 55 must withstand are very considerable, being produced by the friction loading of the nut 30 operating on the screw 29.

It is contemplated that the guides 57 may be inclined at a selected angle from the axial direction illustrated, to provide controlled rotation of the screw 29 if so required to suit the characteristics of the control system. This serves as a differential adjustment, either additional or subtractive to the screw pitch relation between the nut 30 and the screw 29. It is further contemplated that the inclination of the guides 57 may also be adjustable to provide additional flexibility to the system, so that for a constant speed motor 51 the response rate of the screwdown can be preset by an increased or a decreased amount to provide a desired rate of response.

It is further contemplated that the torque arm means 55 may be restrained against rotation by the use of a parallel link mechanism employing pretensioned bearing means to substantially preclude any backlash between the link members and the torque arm member in a manner similar to that disclosed in the preferred embodiment. Alternatively, a Watt straight line mechanism employing pretensioned bearings may be employed.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:
1. In a rolling mill screwdown mechanism having a roll rotatably mounted in end bearings including housings movable longitudinally within end frames, separate roll positioning means for longitudinally positioning the bearings within the frames, each positioning means including a threaded shaft in positioning relation with the housing of a said bearing slidably mounted in the respective frame and extending in the desired positioning direction, nut means rotatably mounted in the frame in threaded engagement with the shaft and having an axial end face thereof in supported axial thrust relation with a portion of the frame, and power input means in rotary driving connection with the nut means, the improvement comprising: substantially rigid torque arm means secured to the shaft, and torque arm guide means in fixed relation with the frame contacting the torque arm means in substantially backlash precluding relation to limit rotational movement thereof, whereby axial movement of the shaft on rotation of the nut means is accurately controlled to provide substantial elimination of backlash.

2. A rolling mill screwdown mechanism as claimed in claim 1 wherein said torque arm means includes at least one outwardly extending torque arm non-rotatably secured to said threaded shaft, guide contact means secured to the outer end of the arm, and guideways in fixed relation to said frame having a pair of guiding surfaces in guiding relation with the guide contact means and extending substantially parallel with the desired direction of movement of the shaft, whereby the shaft is positively restrained against undesired rotational movement.

3. A rolling mill screwdown mechanism as claimed in claim 2 having a plurality of outwardly extending torque arms.

4. A rolling mill screwdown mechanism as claimed in claim 2 wherein said guide contact means include a roller rotatably mounted in prestressed, backlash free relation on a said torque arm, said guideways providing adjustably spaced parallel plane support surfaces in guiding relation with said rollers.

5. A rolling mill screwdown mechanism as claimed in claim 1 wherein said torque arm guide means include contact surfaces in guiding relation with said torque arm means, extending in an inclined direction relative to the main axis of said shaft to permit slight predetermined rotation of said torque arm and the attached shaft on displacement of said torque arm means along said inclined contact surfaces by driving rotation of said nut means, with a substantial absence of backlash.

References Cited

UNITED STATES PATENTS

| 1,576,266 | 3/1926 | Biggert | 74—424.8 X |
| 2,477,169 | 7/1949 | Brekelbaum | 74—424.8 X |
| 2,481,129 | 9/1949 | LeTourneau | 74—424.8 |
| 2,942,506 | 6/1960 | Merting et al. | 72—248 X |

DONLEY J. STOCKING, *Primary Examiner.*

LEONARD H. GERIN, *Examiner.*